March 28, 1967 W. I. CALDWELL 3,311,130
THRUST VECTORING SYSTEM AND CONTROL VALVE THEREFOR
Filed Nov. 27, 1963 2 Sheets-Sheet 1

INVENTOR.
WILLIAM I. CALDWELL
BY
R. E. Granque
ATTORNEY

March 28, 1967 W. I. CALDWELL 3,311,130
THRUST VECTORING SYSTEM AND CONTROL VALVE THEREFOR
Filed Nov. 27, 1963 2 Sheets-Sheet 2

INVENTOR.
WILLIAM I. CALDWELL
BY
R.E. Geaugue
ATTORNEY

United States Patent Office 3,311,130
Patented Mar. 28, 1967

3,311,130
THRUST VECTORING SYSTEM AND CONTROL
VALVE THEREFOR
William I. Caldwell, Canoga Park, Calif., assignor to The
Marquardt Corporation, Van Nuys, Calif., a corporation of California
Filed Nov. 27, 1963, Ser. No. 318,911
3 Claims. (Cl. 137—608)

This invention relates to a thrust vectoring control system and a control valve therefor, and more particularly to a control system for a cluster of fixed rocket motors which are capable of developing only three thrust levels.

In one conventional method, thrust vector control of liquid rocket powered vehicles is obtained from one or more engines mounted on some form of hinged or trunnion joints. During engine operation, the actuators swing the engines about an arc to produce the turning moments required to bring an off-course vehicle back on the desired flight path. In such systems, it is difficult to adequately mount the engine and associated accessories while providing for the hinge or gimbal joint which must withstand the loads produced by the rocket motor. In another method of flight control, fixed thrust chambers have substantially parallel thrust vectors and differential thrust level is utilized for vehicle direction control. In this latter method, the output of the motors is generally variable in proportion to the amount of direction deviation.

The present invention utilizes a differential thrust system which eliminates the need for gimballed thrust chambers and provides a unique control valve which produces a novel vectoring system in which each motor has only three different thrust levels. The invention employs on-off logic for control so that complicated proportional fuel controls are eliminated. The novel control valve permits all of the engines to operate at normal thrust when the vehicle has the correct altitude and when the altitude is not correct the valve reduces the thrust level in one engine and increases the thrust level in the opposite engine to produce a corrective moment. In changing the thrust level of the motors from the normal rating for direction control, there is no attempt to modulate the output thrust since each motor is designed to operate only at three different ratings or levels of output thrust. The valve operates by snap action to change the thrust from one level to another and the magnitude of the required correction is varied by the duration of the corrective mode of operation.

It is therefore an object of the present invention to provide a thrust vectoring system in which the control valve operates the engines at fixed levels above and below a normal thrust level to obtain a resultant corrective moment about a particular thrust axis.

Another object of the invention is to provide a thrust vectoring control in which a cluster of stationary engines are fixed to the controlled vehicle and opposed engines are changed in thrust level by a given increment in order to provide a corrective yaw to bring the vehicle back on its desired course.

Another object of the invention is to provide a control valve for a thrust vectoring system in which the engines are on opposite sides of a control axis and are operated at an increased thrust level and a reduced thrust level to produce a corrective thrust to change the direction of the vehicle.

A further object of the invention is to provide a control valve for a thrust vectoring system which controls two engines on opposite sides of a thrust axis to simultaneously provide a reduced thrust level for one engine and an increased thrust level for another.

These and other objects of the invention not specifically set forth above will become readily apparent from the accompanying description and drawings, in which.

Referring to the embodiment of the invention chosen for purposes of illustration, rocket vehicle 10 has a first axis A—A and a second axis B—B perpendicular thereto. Also, the vehicle has a longitudinal axis C—C which passes through the vehicle center of gravity and is normal to axes A—A and B—B. The vehicle has a cluster of four separate thrust motors which are rigidly fixed to the vehicle with their thrust axis running parallel to the vehicle's longitudinal axis. The thrust axes of the two chambers 11 and 12 lie in the plane of the A—A axis and the longitudinal axis, while the thrust axes of the other two chambers 13 and 14 lie in the plane of the B—B axis and the vehicle's longitudinal axis. The thrust axes of all the chambers are equidistant from the vehicle longitudinal axis, and the four motors provide a predetermined constant total thrust for the vehicle. Each motor is designated to operate at three different ratings or levels of output thrust which can be designated as normal, reduced level (such as 0.9 normal), and increased level (such as 1.1 normal). At normal thrust the motors all produce an equal output thrust and any suitable values above and below the normal rating can be used for the increased and reduced thrust levels. The normal thrust from all four motors would be the predetermined value required for driving the vehicle on an on-course flight path, and only during period in which attitude control is required is it necessary for the motors to shift from normal thrust rating to increased or reduced thrust. In changing thrust level of the motors from a normal rating, there is no attempt to modulate the output thrust and the shift to increased thrust for one and reduced thrust for another motor is accomplished by snap action done within a fraction of a second by the valve means of the present invention.

Figures 1, 2:
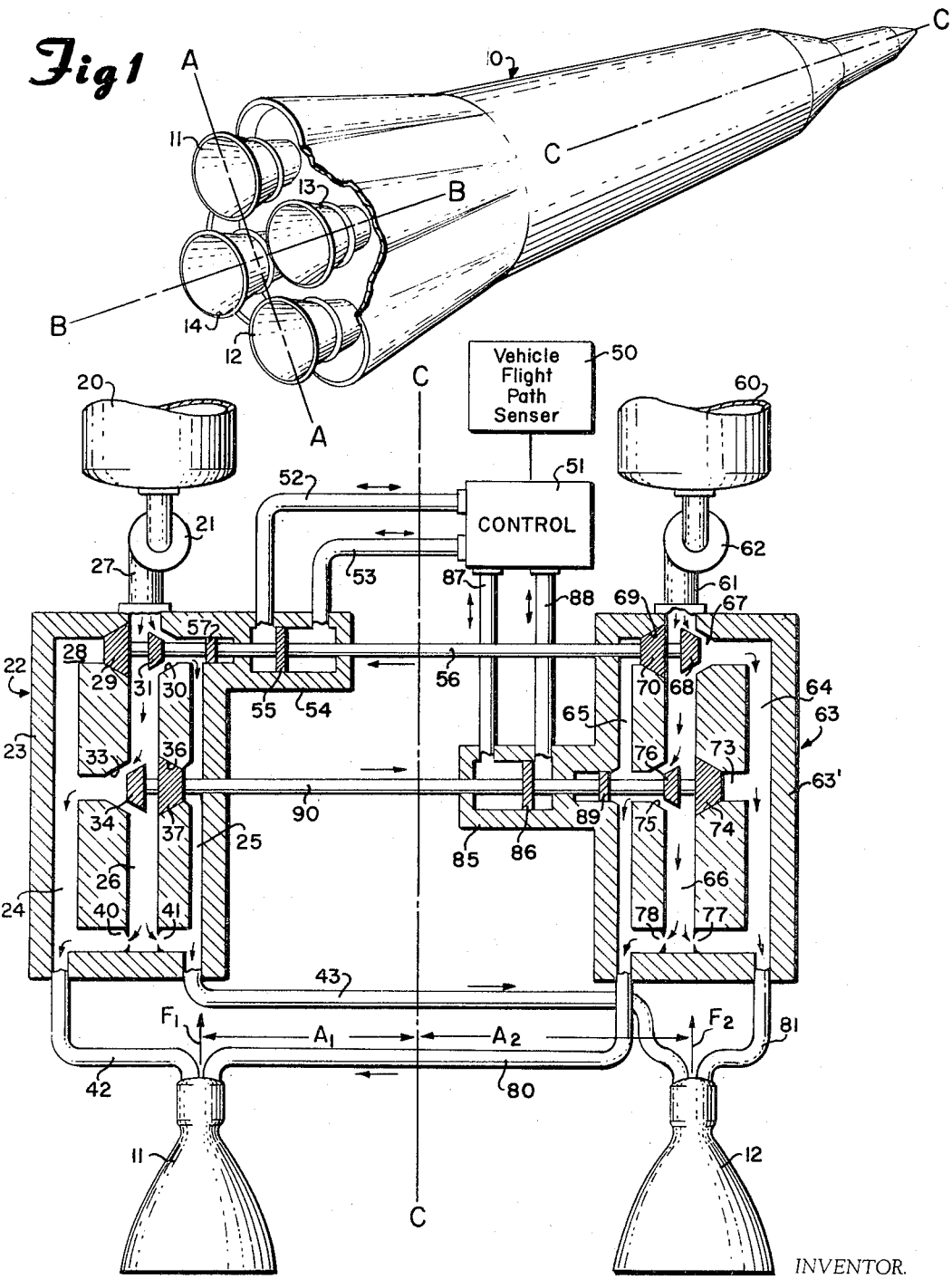
FIGURE 1 is a perspective view of a liquid rocket powered vehicle having four fixed engines of equal thrust mounted on the orthogonal axes A—A and B—B.
FIGURE 2 is a diagrammatic view of the valves for two of the thrust engines showing the position of the valve for normal thrust.

The construction of the valve means of the present invention is shown in FIGURE 2 with the valve elements positioned to operate motors 11 and 12 at normal thrust. If a disturbance is introduced which causes the vehicle to begin turning off course in a yaw about axis B—B to the right in FIGURE 2, the output thrust of the rocket motor 11 shifts from normal to reduced thrust while at the same instant motor 12 shifts from normal to increased thrust. While the total thrust from the two motors is kept constant, a couple is thus produced, and a restoring moment is thereby applied to turn the vehicle to the left back onto the correct direction. If the error should be to the left in FIGURE 2, then the restoring action would be for motor 11 to shift from normal to reduced thrust. A similar action would occur with motors 13 and 14 with respect to the pitch axis A—A and shifting of the thrust level of motors 13, 14 would be accomplished in the same manner as with motors 11 and 12. In other words, while FIGURE 2 which discloses only one pair of motors 11 and 12 for operation about the B—B axis, a similar set of valves is also provided for the motors 13 and 14 and both pairs of motors function in exactly the same manner so that the valve system as disclosed in FIGURE 2 need be described for only one set of motors.

The vehicle 10 carries a tank 20 containing an oxidizer and this tank is connected through pump 21 and passage 27 to the oxidizer control valve 22 for motors 11 and 12. The valve 22 comprises a casing 23 which contains side passages 24 and 25 and a central passage 26. Oxidizer from the pump is connected to side passage 24 through a valve opening 28 controlled by valve element 29 and is also connected to side passage 25 through valve opening 30 controlled by a vave element 31. The central passage 26 is also connected to side passage 24 through an intermediate passage 33 which is controlled by a valve element 34 and is connected to side passage 25 through an intermediate passage 36 which is controlled by a valve element 37. The lower end of central passage 26 connects with side passage 24 through an orifice 40 and connects with side passage 25 through an orifice 41. The oxidizer supply line 42 to motor 11 connects with side passage 24 while the oxidizer supply line 43 to chamber 12 connects with side passage 25.

The vehicle is equipped with a vehicle flight path sensor 50 which comprises a gyro (not shown) of well-known construction to sense the vehicle's altitude and to sense how much it is off course in a particular direction. The flight sensor 50 operates a control valve means 51 in which fluid pressure is supplied to either passage 52 or 53 depending upon the flight condition of the vehicle and these passages connect with chamber 54 at opposite ends of piston 55. A single rod 56 is connected with piston 55 and with the valve elements 29 and 31 and the rod also has an actuating piston 57 slidable in an opening in the casing 23. As illustrated in FIGURE 2, fluid pressure is present in line 53 to urge piston 55 to the left and seat the valve element in the opening 28.

The vehicle also carries a fuel tank 60 which is connected through supply passage 61 and pump 62 to fuel valve 63, and the fuel valve contains side passages 64 and 65 and a central passage 66. Side passage 64 is connected to the fuel supply through passage 67 which is controlled by valve element 68, and side passage 65 connects with the fuel supply through the opening 69 controlled by valve element 70. An intermediate passage 73 connects side passage 64 with central passage 66 and is controlled by valve element 74 and a similar intermediate passage 75 controlled by valve element 76 connects the central passage 66 with the side passage 65. The end of central passage 66 is connected to side passage 64 through an orifice 77 and is connected to the side passage 65 through orifice 78. The fuel supply line 80 to motor 11 connects with passage 65 while the fuel supply line 81 to motor 12 connects with passage 64. The valve elements 68 and 70 are mounted on shaft 56 and valve element 70 closes passage 69 when the piston 55 is driven to the left for normal thrust operation.

The casing 63' for the valve 63 has an offset chamber 85 which contains a piston 86, and fluid lines 87 and 88 connect opposite sides of piston 86 with the control unit 51. A shaft 90 is connected with piston 86 and with valve elements 34, 37, and 74, 76 and also has an actuating piston 89 located in an opening in the casing 63'. In the operating condition for normal thrust, illustrated in FIGURE 2, high pressure fluid is present in line 87 so that piston 86 is forced to the right to close passage 36 with valve element 37 and to close passage 73 with valve element 74.

In the position of the valves 22 and 63 as illustrated in FIGURE 2, the oxidizer is divided at valve 31, a portion going down the center passage 26 where it again divides, some continuing on down the center passage, while another portion is diverted by valve 34 to the side passage 24. At the bottom of the center passage 26, the oxidizer is again divided, some passing to the left through the orifice 40 from which it joins oxidizer from valve 34 to flow through supply line 42. At the same time, another portion of the liquid oxidizer has passed through valve 31 and flows down the side passage 25 and rejoins oxidizer which has come from the center passage 26 through the orifice 41 and the total oxidizer enters the outlet passage 43. The fluid pressure drops through the valve 34 and the orifice 40 are equal and also the pressure drops through the valves 31 and orifice 41 are equal. The restrictive effect of the open valve 34 and the orifice 40 are designed to establish the correct flow rate of oxidizer to motor 11 for a given fluid pressure entering the oxidizer valve 22. By the same token, the valve 31 and the orifice 41 control the oxidizer flow to the motor 12 to provide a normal thrust output which is equal for both of the motors. Since both of the motors produce normal thrust, the valve openings for valves 31 and 34 have equal flow rates as well as do the orifices 41 and 40.

Referring to the fuel valve 63, the entering fuel divides at valve 68, one stream passing into the center passage 66, to valve 76 where it again divides. A portion of fuel continues to the bottom of center passage 66 and divides again passing outward through orifices 77 and 78. At the same time, a fuel portion flows from valve 68 to side passage 64. From the orifices, fuel rejoins that in passages 64 and 65 before entering outlet passages 81 and 80, respectively. While the flow control in fuel valve 63 is the same as that in oxidizer valve 22, the actual mass flow rate of fuel and oxidizer is determined by the fuel-oxidizer ratio and the predetermined thrust of the motor. The thrust vector for motor 11, shown as $F_1$, acts about moment arm $A_1$ relative to the centerline of gravity axis C—C of the vehicle, while the thrust vector $F_2$ for the motor 12 acts about moment arm $A_2$ which equals arm $A_1$. When $F_1$ and $F_2$ are of equal magnitude, the net effective thrust acts through the vehicle center of gravity. Since the thrust motors 13 and 14 are supplied with similar fuel and oxidizer valves 22, 63, and can produce normal thrust of equal magnitude at equal distance from the center of gravity, the net effective thrust of this pair of motors is also through the vehicle's center of gravity.

*Corrective thrust—Left yaw*

Figure 3:
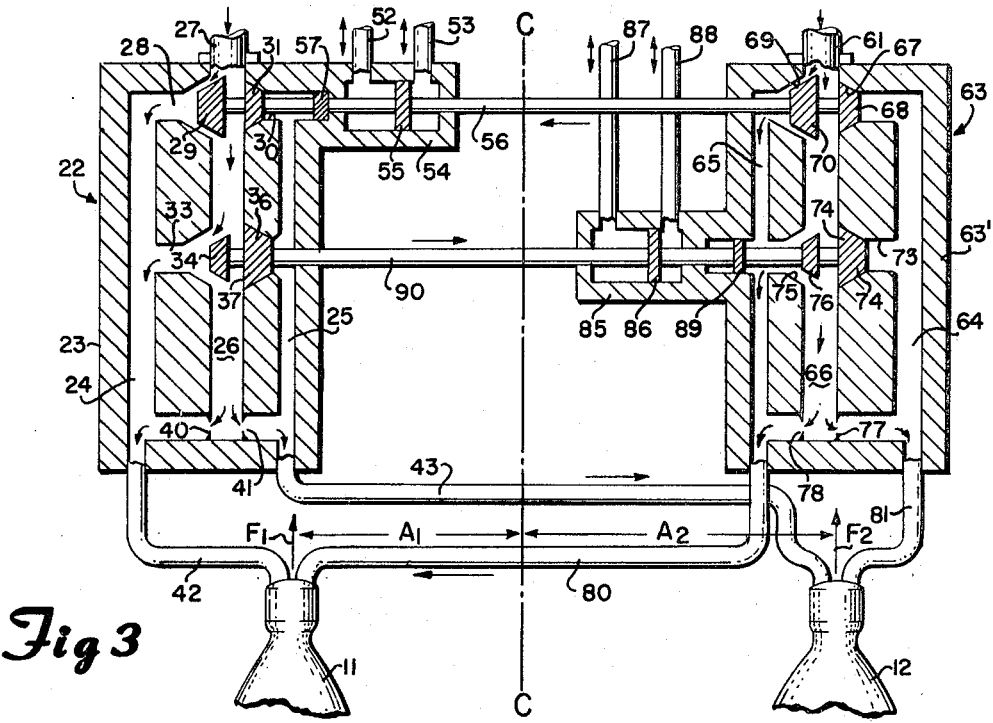
FIGURE 3 is a diagrammatic view of the valves similar to FIGURE 2 and showing the condition of the valves for producing a corrective yaw moment on the vehicle.

If, from the correct flight path, the vehicle should begin to turn to the left in FIGURE 2 about axis B—B (counterclockwise yaw), the flight path sensor 50 will detect the error and will transmit an appropriate signal to the control unit 51, which in turn will immediately introduce high pressure fluid through line 52 to rapidly drive piston 55 to the right while the chamber 54 drains through line 53. This snap action opens valve elements 29 and 69, and closes valves 31 and 68 to obtain the valve setting shown in FIGURE 3. The piston 57 attached to shaft 56 receives the pressure of the oxidizer against its face which continually urges the shaft 56 to the right so that piston 29 develops a force helping to provide a rapid break-away movement of the valve shaft 56 for fast response operation. When valve 29 is open and valve 31 closed, a larger portion of the oxidizer will flow to the side passage 24 than when the valve 29 is closed during normal thrust operation. At the same time, the opening of the large valve 69 in fuel valve 63 will provide a larger flow of fuel to the side passage 65 of this valve. This increase in oxidizer and fuel flow is reflected in passages 42 and 80, respectively, leading to the chamber 11 and shifts its output thrust from normal thrust to the increased thrust level (such as 1.1 normal).

At the same time, the closing of the valve 31 stops the flow of the oxidizer in the side passage 25 of valve 22 so that the total flow of oxidizer in outlet passage 43 is then reduced to that which passes through the center passage 26, divides and then flows through orifice 41. Also, with valve 68 closed, no fuel flows to the side passage 64 of the fuel valve 63 and the total fuel flow in the passage 81 is that from the center passage 66 which has divided and passed through the orifice 77. The reduced oxidizer and fuel flow in passages 43 and 81 to the motor 12 thus shifts its output thrust to the reduced level (such as 0.9 normal). It is pointed out that during this corrective mode of operation the total applied thrust from the two motors 11 and 12 has not changed. The increment of thrust reduction of one, namely motor 12, is exactly equal to the thrust increase of the motor 11. Thus, with $F_1$ at 1.1 normal thrust and $F_2$ at 0.9 normal thrust, a turning moment is created to restore the flight direction of the vehicle. It is apparent that during the right thrust corrective mode, the piston 86 is held fixed in its position to the right by the control unit 51.

*Corrective thrust—Right yaw*

Figure 4:
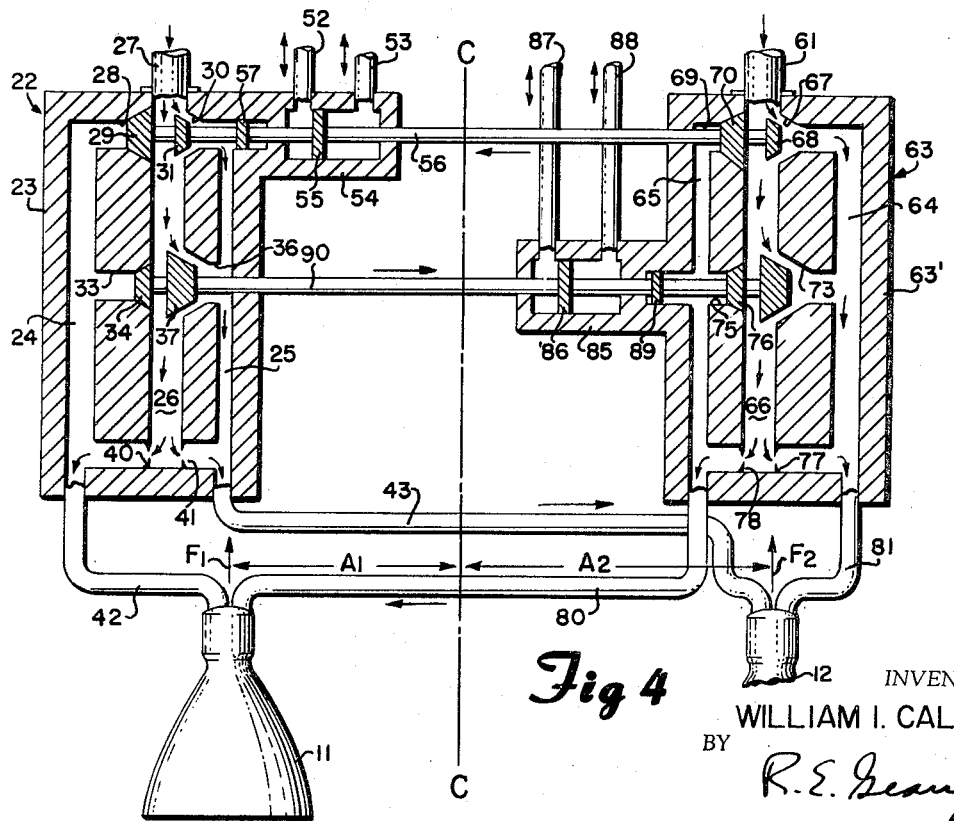
FIGURE 4 is a diagrammatic view of the valves as used in FIGURE 2 showing the condition of the valves to produce a corrective moment in the opposite direction from that of FIGURE 3.

If the vehicle should begin to turn to the right in FIGURE 2 about axis B—B (clockwise yaw) from a correct flight path, the correction of the flight path is accomplished in a manner similar to that previously described for a left yaw correction. The error is detected by the sensor 50 and a signal is sent to the control unit 51 for shifting the output thrust of motor 11 from normal to reduced level (such as 0.9 normal) and the output of motor 12 from normal to increased level (such as 1.1 normal). A counteracting moment is thus applied to turn the vehicle to the left to bring it back on course. As before, the duration of the corrective thrust mode is dependent upon the magnitude of the yaw error. For this mode of operation, the control unit 51 introduces high pressure fluid through line 88 to the chamber 85 to shift the piston 86 to the left as illustrated in FIGURE 4 while the piston 55 is held in its left position corresponding to that for normal thrust. The movement of piston 86 opens the valves 37 and 74 and closes the valves 34 and 76. The rapid snap action movement of the piston 86 to the left is aided by piston 89 with fuel pressure acting against its face. The opening of valve 37 results in a larger flow of oxidizer from the center passage 26 to the side passage 25 and consequently a larger flow of oxidizer in outlet passage 43 to the motor 12. Likewise, the opening of valve 74 results in a larger flow of fuel into the side passage 64 and into the outlet passage 81 leading to the motor 12. The result is a shift in thrust from normal to increased level (such as 1.1 normal) for the motor 12. In the same manner, the closing of the valves 34 and 76 reduces the flow of oxidizer and fuel going to the motor 11 to that passing through the orifices 40 and 78, respectively. Thus, the output of the motor 11 is shifted from normal to reduced level (such as 0.9 normal) and the resulting turning moment acting around the vehicle center of gravity return the vehicle back to zero yaw error.

*Pitch control*

While the above description relates to the corrective thrust that is associated with yaw control about axis B—B by motors 11 and 12 in the A—A plane in FIGURE 1, the operative procedure is equally applicable for pitch control of the vehicle about axis A—A with motors 13 and 14 in the B—B plane. In the event of a nose-down pitch error in the flight path about axis A—A, normal thrust of motors 13 and 14 is changed by the control 50 so that motor 14 is shifted to increased level (such as 1.1 normal) and the motor 13 is shifted to reduced level (such as 0.9 normal). Conversely, if a nose-up pitch error occurs, motor 13 is shifted to increased level (such as 1.1 normal) while motor 14 is shifted to reduced level (such as 0.9 normal) for whatever durations are required to restore the vehicle direction to an on-course flight path. In actual flight, both pitch and yaw corrections can be applied to the vehicle simultaneously since there is a complete set of control units 51 and valves 22, 63 for each pair of rocket motors.

Since there is no modulation of thrust between normal and increased thrust (1.1 normal) and between normal and reduced thrust (0.9 normal), the magnitude of the required correction is varied by the duration of the corrective mode of operation. In other words, for an error in altitude, the control system will move the valve elements in the corrective direction and hold the elements in that position for a period of time to bring the vehicle back on course. For a large error, the control system will hold the valve elements in corrective position for a longer period than required for a small error.

By the present invention, a thrust vectoring control system is provided in which the valves for each pair of motors operate in one of three modes, either producing normal thrust for both motors or reduced thrust from one motor and increased thrust from the other. The valve elements for the valves of two opposed motors are interconnected so that a shift of one valve element in one valve is accompanied by a shift of the corresponding valve elements of the other valve. However, it is understood that additional actuator pistons could be utilized to shift each valve element independently but in the same mode. Also, it is understood that the cluster of combustion chambers could be increased in number and that several pairs of motors could be operating in the corrective mode at one time. Various other modifications are contemplated by those skilled in the art without departing from the spirit and scope of the invention as hereinafter defined by the appended claims.

What is claimed is:

1. A control valve for controlling the flow of a fluid to two separate locations comprising:
   a valve housing;
   a central passage and two side passages in said housing;
   separate fluid openings connecting the entrance end of said central passage with said side passages;
   separate conduits connecting an intermediate portion of said central passage with said side passages;
   separate orifices continually connecting the terminal end of said central passage with said side passages; and
   valve elements for selectively controlling said fluid openings and said fluid conduits to supply equal amounts of fluid to said side passages or to supply a fixed differential of fluid to said side passages.

2. A control valve as defined in claim 1 wherein said valve elements for said fluid openings are fixed together to close one of said openings and clear the other of said openings, said valve elements for said fluid conduits being fixed together to close one of said conduits and clear the other of said conduits.

3. A control valve as defined in claim 2 having actuation means for positioning said valve elements to close one opening to one of said side passages and one conduit to the other of said side passages and for positioning said valve elements to close one opening and one conduit to the same side passage to provide a differential fluid supply to said side passages.

References Cited by the Examiner

UNITED STATES PATENTS

| | | | |
|---|---|---|---|
| 2,726,510 | 12/1955 | Goddard | 60—35.6 X |
| 3,010,316 | 11/1961 | Snyder | 137—599 X |
| 3,070,330 | 12/1962 | Escher | 244—76 |
| 3,134,225 | 5/1964 | Pennington | 60—35.54 |

MARK NEWMAN, *Primary Examiner.*

A. L. SMITH, *Assistant Examiner.*